United States Patent
Prioretti et al.

(10) Patent No.: US 6,787,731 B1
(45) Date of Patent: Sep. 7, 2004

(54) METHOD FOR OXYACETYLENE-CUTTING A PIECE OF STEEL AND DEVICE FOR CARRYING OUT THIS METHOD

(76) Inventors: Guy Prioretti, 13 rue Alexandre Dreux, 57100 Thionville (FR); Véronique Prioretti, 11 rue Alexandre Dreux, 57100 Thionville (FR); Françoise Prioretti-Hacking, 13 rue Alexandre Dreux, 57100 Thionville (FR); Jean-Michel Prioretti, 2 rue Pellerin, 57100 Manom (FR)

( * ) Notice: Subject to any disclaimer, the term of this patent is extended or adjusted under 35 U.S.C. 154(b) by 151 days.

(21) Appl. No.: 10/110,938
(22) PCT Filed: Oct. 3, 2000
(86) PCT No.: PCT/FR00/02737
§ 371 (c)(1),
(2), (4) Date: Apr. 18, 2002
(87) PCT Pub. No.: WO01/28727
PCT Pub. Date: Apr. 26, 2001

(30) Foreign Application Priority Data

Oct. 19, 1999 (FR) .............................. 99 13004

(51) Int. Cl.[7] .............................................. B23K 10/00
(52) U.S. Cl. ............................. 219/121.44; 219/121.39; 219/121.59; 219/121.49; 266/77; 266/50; 148/222
(58) Field of Search ..................... 219/121.39, 121.49, 219/121.59, 121.48, 121.36, 121.51; 266/48–52, 77; 148/194, 200, 203–205, 222

(56) References Cited

U.S. PATENT DOCUMENTS

| | | | |
|---|---|---|---|
| 4,336,078 A | * | 6/1982 | Radtke ........................ 148/9 R |
| 5,312,091 A | * | 5/1994 | Vogrin .......................... 266/51 |
| 6,219,894 B1 | * | 4/2001 | Lotz ............................ 29/33 A |
| 6,334,906 B1 | * | 1/2002 | Donze et al. ................ 148/203 |

* cited by examiner

Primary Examiner—Mark Paschall
(74) Attorney, Agent, or Firm—Sughrue Mion, PLLC

(57) ABSTRACT

The invention relates to apparatus for oxygen cutting pieces of steel. The cutter and trimmer members (5, 10) are positioned in such a manner that the cutting jet (6) is applied to the top face (1.1) of the piece (1) in a substantially vertical direction, while the trimming jet (12) is applied to the bottom face (1.2) of said piece in an oblique direction that remains pointed towards the outlet point (14) of the cutting jet (6), simultaneous cutting and trimming being performed by moving the cutter and trimmer members (5, 10) horizontally in synchronous manner. A sprayer member (11) is also provided for spraying fluid during the cutting process towards molten particles in order to reduce fume emissions.

11 Claims, 4 Drawing Sheets

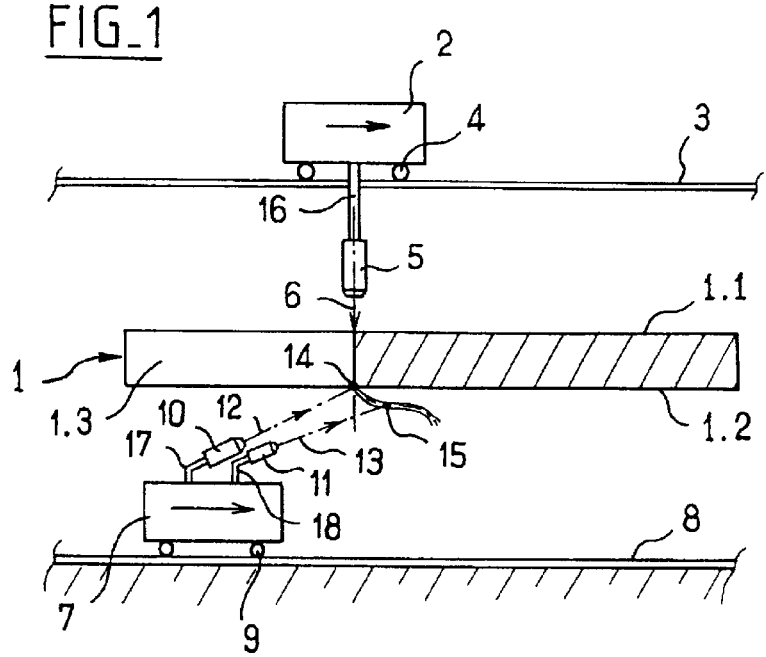
FIG_1
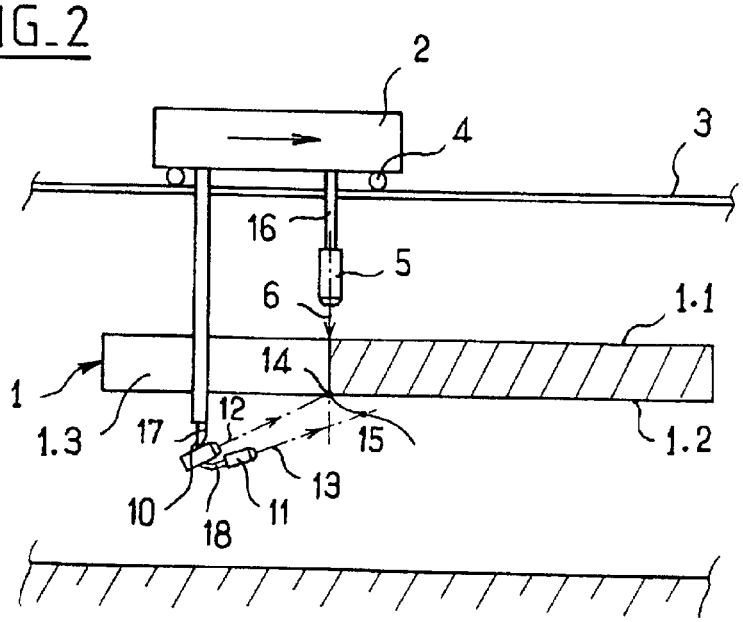
FIG_2

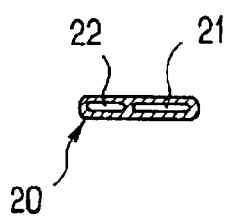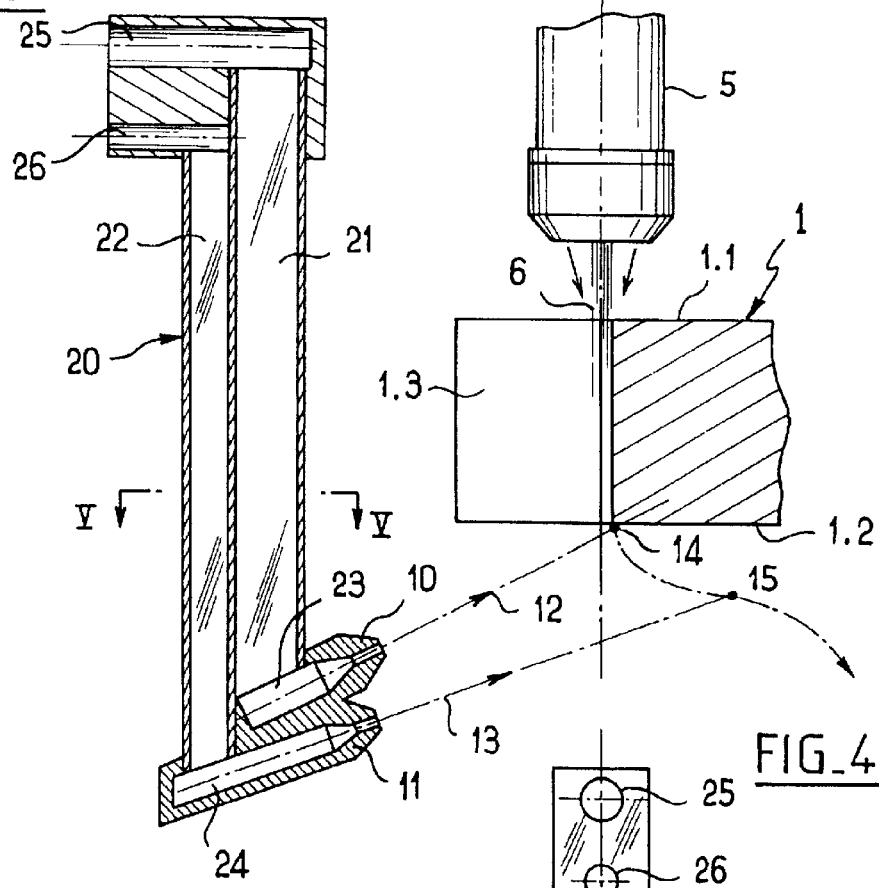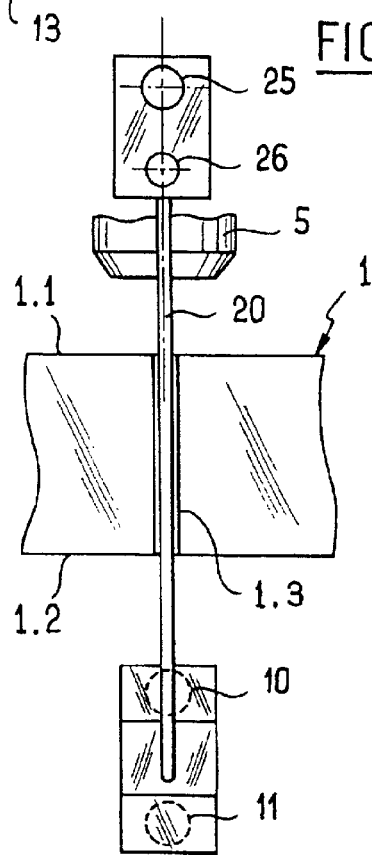

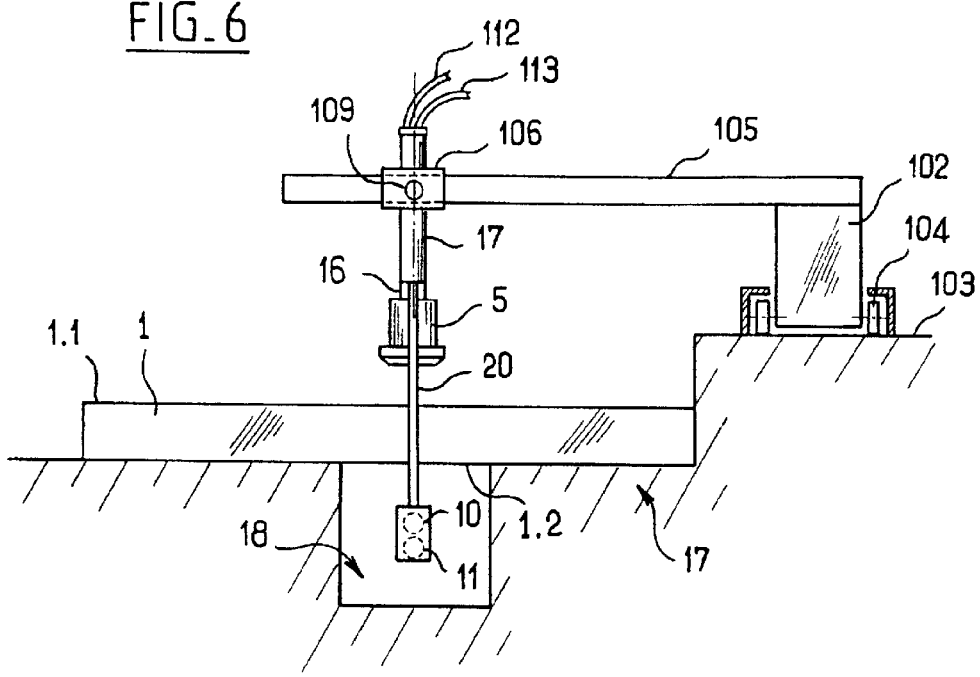
FIG_6
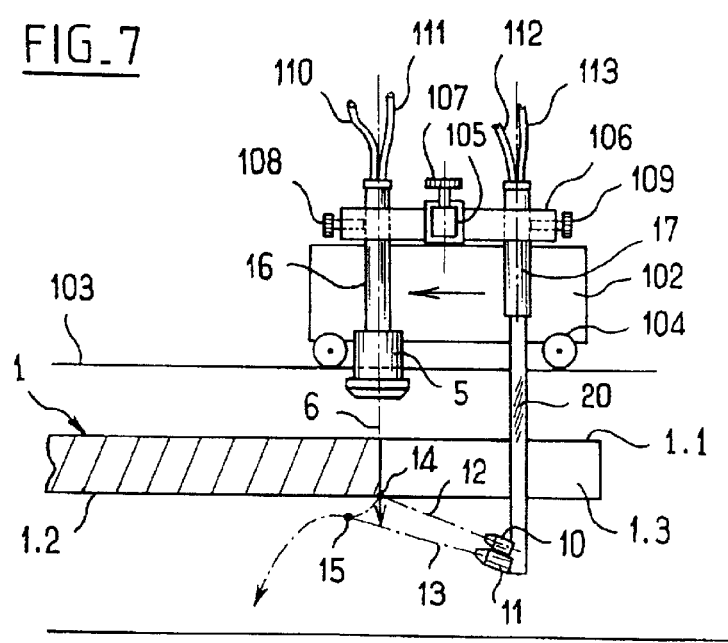
FIG_7

FIG_8
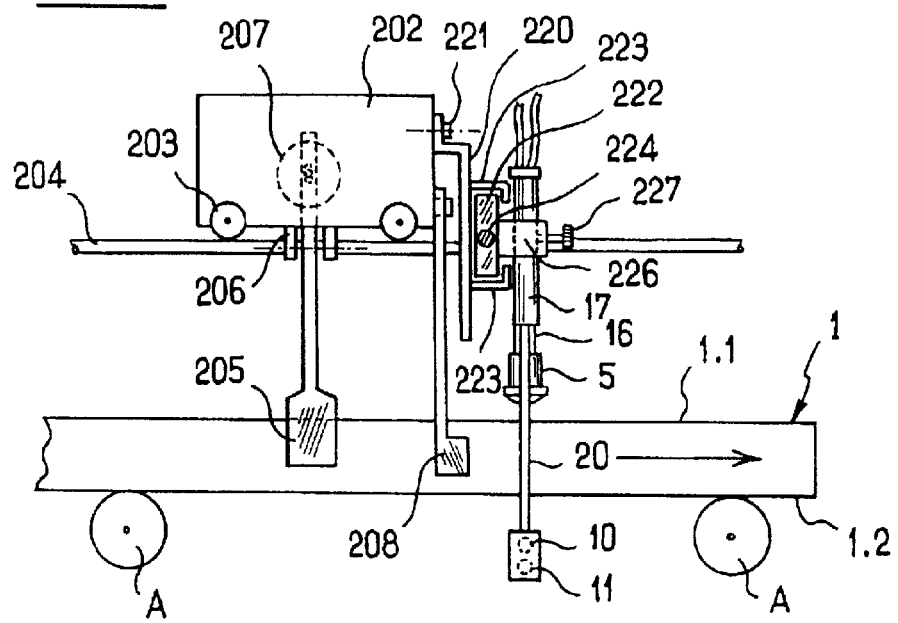
FIG_9
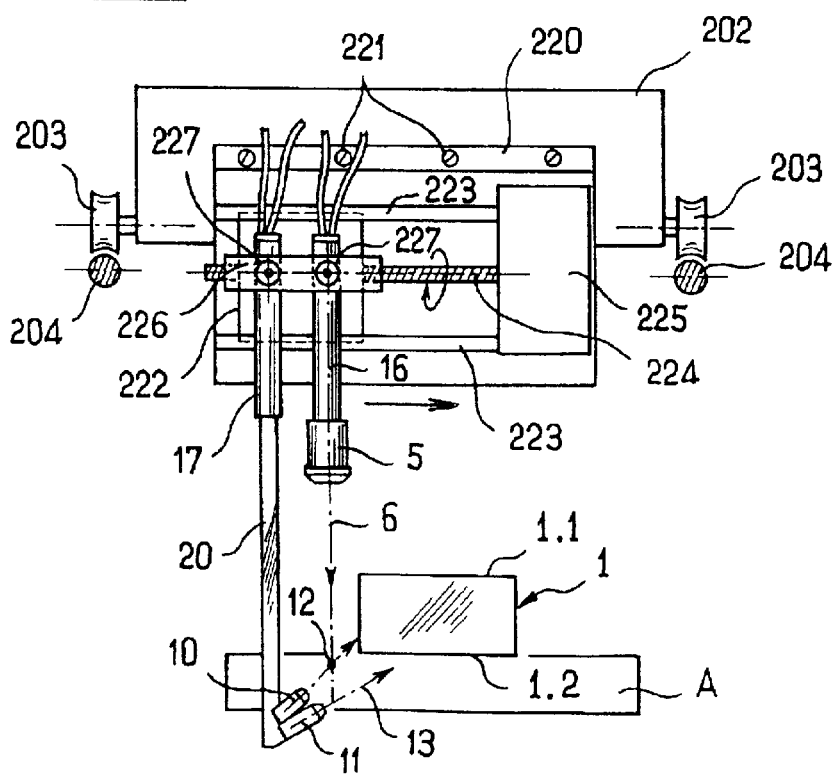

METHOD FOR OXYACETYLENE-CUTTING A PIECE OF STEEL AND DEVICE FOR CARRYING OUT THIS METHOD

The present invention relates to a method and to apparatus for oxygen cutting pieces of steel such as slabs, sheets, billets, and blooms.

The technological background is illustrated by document EP-A-0 639 416 which describes a two-line oxygen-cutting installation, each line comprising a moving carriage for a pendular type oxygen-cutter torch. Reference can also be made to document U.S. Pat. No. 2,820,420 which describes an oxygen-cutting torch cantilevered-out on a carriage that can be moved horizontally, and to document WO-A-96/20818 which describes a traveling crane carrying a telescopically-extendible vertical working arm.

Reference can also be made to documents U.S. Pat. No. 2,288,026 and U.S. Pat. No. 2,541,344.

Oxygen-cutting pieces of steel, and more particularly in steelmaking slabs, sheets, billets, and blooms, generally forms unburnt molten metal residues at the outlet surface of the cutting jet, with a fraction of the residue that is not ejected into the surrounding atmosphere by the cutting jet sticking to the outlet lips of the cut slot, and with this happening over the entire length of the slot so as to form a cutting bead or rim. As a result, at the end of the cutting process, each edge of the slot on its cutting jet outlet side presents a bead which is constituted by a mixture of the basic metal together with iron oxide. This unwanted bead adheres strongly to the bodies of the cut-apart pieces, and it is necessary to provide an additional operation of removing such beads which are of greater or lesser size depending on the grades of steel involved, the speed of cutting, and the types and adjustments of the oxygen-cutter torch. The cutting beads are generally removed by trimming, either manually using a blow torch, a chisel, or a grinder, or indeed mechanically by means of an appropriate machine. In all cases that involves an additional finishing operation which implies extra cost that penalizes production cost price.

To solve that problem, proposals have already been made for a method of oxygen cutting a piece of steel in which a cutter member is positioned in such a manner that the cutting jet is directed towards a first face of the piece to be cut and a trimmer member is positioned in such a manner that the trimming jet is directed to a second face, opposite from the first, towards the outlet point of the cutting jet so as to perform trimming simultaneously on the cutting bead as it forms on said second face, with the positioning of the cutter and trimmer members being such that the cutting jet is applied to the top face of the piece in a substantially vertical direction, while the trimming jet is applied to the bottom face of said piece in an oblique direction that remains pointing towards the outlet point of the cutting jet, simultaneous cutting and trimming being performed by moving the cutter and trimmer members horizontally in synchronous manner. In this respect, reference can be made to documents EP-A-0 017 807 (& U.S. Pat. No. 4,336,078) and DE-A-20 43 539.

With continuously cast billets, combined oxygen-cutting and trimming apparatus has already been proposed in which a cutter member is positioned in such a manner that the cutting jet is directed towards a first face of the piece to be cut and a trimmer member is positioned so that the trimming jet is directed towards a second face opposite to the first, towards the outlet point of the cutting jet so as to perform simultaneous trimming of the cutting bead as it forms on said second face. Such a process is described in document WO-A-99/16570. In that method, the cutter member and the trimmer member are positioned by taking a direct reference from the continuously cast billet by using a moving clamp. Once the reference has been taken, the cutter member and the trimmer member are lowered parallel to the side faces of the billet so as to cut it progressively downwards by horizontally engaging one of the side faces of the billet while simultaneously trimming the cutting bead that forms on the other side face by attacking said other side face in a direction that is continuously directed downwards. Thus, in that technique, the cutting jet is horizontal and it is applied to one of the side faces of the billet, and this applies throughout the cutting process.

That technique is indeed advantageous for oxygen cutting continuously cast billets, however it remains very limited because of the way in which the oxygen cutting is unsuitable for use on other steel products.

Firstly, it can be observed that that method is not adaptable to cutting slabs or other products of great width. Since the oxygen cutting is performed horizontally, such a configuration is out of the question when the product to be cut is of great width, as is the case for slabs or sheets. It would be unrealistic to imagine clamping the product that is to be cut by means of the reference clamps, and above all making an oxygen-cutting jet of sufficient power to perform cutting across the entire width of the product.

That technique is also unsuitable for splitting operations, i.e. cutting products in the lengthwise direction, which operation is often performed on slabs or sheets. This unsuitability is both physical with continuous cast slabs, and economic with slabs and sheets outside continuous casting because of the need for expensive handling of the products or because of the size and the complexity of installations capable of implementing that technique.

In all cases, in practice it is found that large amounts of fumes are present in the outlet zone of the cutting jet, with these fume emissions being generated by the post-combustion of unburnt molten metal residues that are ejected by the cutting jet and by the trimming jet.

The invention seeks to design an oxygen-cutting technique that makes it possible to avoid the above-mentioned drawbacks and/or limitations.

Thus, an object of the invention is to provide a method of oxygen cutting a piece of steel and apparatus for implementing the method which are capable of cutting a very wide variety of types of pieces of steel in regular manner without leaving any cutting bead, while simultaneously reducing fume emissions, and to do so regardless of the width of the product that is to be cut. The looked-for technique must, in particular, be capable of performing splitting operations under good conditions both technically and economically.

According to the invention, this problem is resolved by a method of oxygen cutting a piece of steel, in which a cutter member is positioned in such a manner that the cutting jet is directed towards a first face of the piece to be cut and a trimmer member is positioned in such a manner that the trimming jet is directed towards a second face, opposite from the first face, towards the outlet point of the oxygen-cutting jet so as to perform trimming simultaneously on the cutting bead as it forms on said second face, with the positioning of the cutter and trimmer members being such that the cutting jet is applied to the top face of the piece in a substantially vertical direction, while the trimming jet is applied to the bottom face of said piece in an oblique direction that remains pointing towards the outlet point of the cutting jet, simultaneous cutting and trimming being performed by moving the cutter and trimmer members horizontally in synchronous manner, the method being remarkable in that a sprayer member is positioned beneath the piece in such a manner that a fluid jet is sprayed during the cutting process towards the molten particles ejected by the cutting jet so as to reduce fume emission.

According to an advantageous characteristic, the spray jet is directed towards the zone at the top of the parabolic trajectory followed by falling molten particles.

It is then preferable for the sprayer member to be moved horizontally synchronously with the cutter and trimmer members, the cutting, trimming, and spray jets remaining in a common vertical plane.

It is also advantageous to make provision for the sprayer member to be carried by the support for the trimmer member passing through the cut slot.

Also advantageously, the support for the trimmer and sprayer members is set into vertical vibration during the cutting process. Such vertical vibration facilitates progress of the support passing through the cut slot.

The invention also provides apparatus for implementing the above-specified oxygen-cutting method, the apparatus being remarkable in that it comprises a carriage that is horizontally movable on associated rails, said carriage carrying supports for a cutter member and for a trimmer member, which supports overlie the piece to be cut, the support for the trimmer member including a thin blade for passing through the cut slot, said thin blade which supports the trimmer member also supporting a fluid sprayer member.

The presence of the thin blade is extremely advantageous insofar as it makes it possible to organize support for the cutter, trimmer, and sprayer members from above the piece that is to be cut, thereby leaving completely empty the space that is situated beneath said piece. In addition, because of its rigidity, the thin blade makes it possible to guarantee that the various supported members are properly positioned relative to one another, both in terms of position and in terms of inclination.

Advantageously, the trimmer and sprayer members are both mounted at the end of the thin blade, each being inclined upwards at a respective predetermined angle.

The fluids necessary for the trimmer and sprayer members can be fed by means located beneath the piece that is to be cut. Nevertheless, in order to avoid the drawbacks to be expected from projected splashes of molten metal, it is advantageous to provide for feeding to take place from above the piece.

To this end, and in accordance with another advantageous characteristic, the thin blade is hollow for feeding the fluid(s) required.

It is also advantageous to provide for the thin blade to be coupled to a vibrator capable of imparting small-amplitude vibration in a vertical direction, thereby avoiding any risk of metal droplets sticking in the slot, since that could impede proper progress of the thin blade during the cutting process.

Also preferably, the supports for the cutter, trimmer, and sprayer members are individually adjustable in position in a vertical direction. These individual adjustments are important to make it possible to adapt to pieces for cutting having a variety of thicknesses.

In a particular embodiment, the carriage moves along the piece and carries a cantilevered-out beam on which the supports for the cutter, trimmer, and sprayer members are mounted via a sleeve slidably mounted on said beam.

In a variant, when oxygen cutting a continuous casting, it is advantageous to provide for the carriage to move above the casting and to carry a moving clamp for clamping onto said casting via its side faces, said carriage being capable of receiving a removable frame carrying a slider that is movable across the casting direction, which slider carries the supports for the cutter, trimmer, and sprayer members. This makes it possible in particular to use the installation described in above-cited document WO-A-99/16570 by replacing the horizontal oxygen-cutting jet cutter and trimmer unit with another unit that is secured to the removable frame to provide the vertical cutting jet in accordance with the invention.

Other characteristics and advantages of the invention appear more clearly in the light of the following description and the accompanying drawings relating to particular embodiments, and referring to the figures, in which:

FIG. 1 is a diagram of an installation for implementing the oxygen-cutting method of the invention, in a first embodiment having two separate carriages organized to move horizontally in synchronous manner;

FIG. 2 is a diagrammatic view showing another variant implementation of the oxygen-cutting method of the invention in which the support for the trimming and spraying members passes through the cut slot;

FIG. 3 shows, on a larger scale, the members used in the FIG. 2 variant, with a thin blade which supports the trimming and spraying members;

FIG. 4 is an end view of the components of FIG. 3 showing more clearly how the thin blade passes through the cut slot;

FIG. 5 is a section on V—V of FIG. 3 showing the fluid-passing ducts inside the thin blade;

FIGS. 6 and 7 are respectively an end view and a section view of an embodiment of the apparatus for implementing the method, using a carriage which moves laterally along the piece which is to be cut; and FIGS. 8 and 9 are an elevation view and an end view respectively of another variant of the apparatus in which the carriage travels over a continuous casting and carries a moving clamp for holding the casting.

FIG. 1 shows a piece of steel such as a slab, a billet, or a bloom that is being cut using the oxygen-cutting method of the invention. The piece 1 to be cut presents a top face 1.1 and a bottom surface 1.2, and it rests horizontally on supports (not shown in the figure). A carriage 2 is movably mounted on rails 3 by means of wheels 4, and the carriage carries a cutter member 5 which is an oxygen-cutting torch by means of a rigid support 16. The cutter member 5 is positioned in such a manner that the oxygen-cutting jet referenced 6 is applied to the top face 1.1 of the piece 1 in a direction that is substantially vertical. Beneath the piece 1, another carriage 7 is provided which is mounted to move on rails 8 via associated wheels 9. This carriage 7 carries a trimmer member 10 via a support 17, which trimmer member is positioned in such a manner that the trimming jet referenced 12 is applied to the bottom face 1.2 of the piece 1 in an oblique direction that remains pointed towards the outlet point referenced 14 of the cutting jet 6.

In this embodiment, which is intended more particularly for a slitting operation, simultaneous cutting and trimming are performed by moving the cutter 5 and the trimmer 10 horizontally in synchronous manner by appropriately controlling the movement of the associated carriages 2 and 7. It is important to observe that the trimming is performed by a torch operating in "ceiling" mode, i.e. from underneath a piece that is being cut, which is highly advantageous compared with traditional systems using a horizontal oxygen-cutting jet, such as that disclosed in above-cited document WO-A-99/16570. Ceiling mode trimming is particularly effective insofar as this configuration is highly favorable for ensuring that the trimmed-off beads become detached and fall away easily and quickly under the effect of the forces of gravity. In addition, since the trimmer 10 is behind the cutting jet, there is no obstacle in the immediate vicinity to disturb downstream ejection of particles.

In FIG. 1, it should also be observed that a sprayer member 11 is present mounted on an associated support 18 carried by the carriage 7 which supports the trimmer member 10.

Thus, the sprayer 11 is positioned beneath the piece 1 in such a manner that a jet of fluid 13 is sprayed during the cutting process onto the molten particles ejected by the cutting jet 6 so as to reduce fume emissions. In practice, the cutter 5, the trimmer 10, and the sprayer 11 are arranged in such a manner that the three corresponding jets respectively referenced 6, 12, and 13 are all contained in a common vertical plane throughout the cutting process. The sprayed fluid which can be water or oxygen acts as an extinguishing fluid with respect to incandescent particles. By spraying cold fluid in this manner on the post-combustion particles of steel coming from the cutting and trimming jets, the volume of fumes emitted can be reduced considerably.

In the above embodiment, the supports firstly for the cutter and secondly for the trimmer and sprayer are arranged on opposite sides of the piece 1 that is to be cut. This requires good synchronization to be organized in controlling the advance of the two carriages 2 and 7 so as to ensure that the jets 12 and 13 are always properly directed relative to the outlet from the cutting jet 6 situated at the leading end of the cut slot referenced 1.3. Nevertheless, in a variant embodiment, the invention provides for the support to be carried from the same side of the piece that is to be cut, in particular by being disposed above said piece.

This variant is described below and is shown diagrammatically in FIG. 2.

In accordance with the invention, displacement of the cutter 5, the trimmer 10, and the sprayer 11 is synchronized by arranging for all of the supports coupled to said members to be disposed on the same side of the piece, with one of said supports extending through the cut slot 1.3. Specifically, the supports 17 and 18 for the trimmer 10 and the sprayer 11 are united to form a common support in the form of a blade 20 which is thin enough to pass through the cut slot 1.3. Thus, the support 16 and 20 for the cutter 5 and for the trimmer 10 are disposed above the piece 1, and it is the support 20 for the trimmer 10 which passes through the cut slot 1.3. Naturally, it is possible to provide the inverse arrangement in which the carriage 2 does not overlie the piece 1, but is located underneath it. Nevertheless, it is more advantageous to use this overlying disposition since it makes it possible for the space situated beneath the piece that is to be cut to be left completely empty.

The rigid support provided by the blade 20 which passes through the cut slot 1.3 makes it possible to avoid performing any complex operation of synchronizing two separate carriages, and it ensures that the three members 5, 10, and 11 are permanently positioned relative to one another, and thus that the three associated jets 6, 12, and 13 are always properly positioned.

As in the FIG. 1 variant, the thin blade 20 carries a sprayer 11 whose jet 13 is directed towards the molten particles ejected by the cutting jet 6. It is advantageous for the spray jet 13 to be directed towards a zone referenced 15 corresponding to the top of the parabolic trajectory followed by the falling molten particles. The particles are initially subjected to kinetic energy by the cutting jet 6 and the trimming jet 12 so their trajectory presents a point of inflection having a horizontal tangent prior to beginning the corresponding parabolic portion solely under the influence of the forces of gravity. This point of inflection, which corresponds to the above-mentioned zone 15, constitutes an ideal target for the spray jet since the particles are then traveling at substantially zero speed.

FIGS. 3 to 5 show more clearly how the cutter 5, trimmer 10, and sprayer 11 are arranged together with their respective jets 6, 12, and 13. The thin blade 20 supporting the members 10 and 11 is shown in section. In this case, the thin blade 20 supporting the members 10 and 11 is hollow so as to feed the required fluids. There can thus be seen two ducts 21 and 22 reaching the inside spaces 23 and 24 of the members 10 and 11 so as to deliver the corresponding fluids which are fed in via inlets 25 and 26. The trimming fluid is generally oxygen, but it is also possible to provide water or any other equivalent fluid. For spraying, it is generally suitable to use cold water. It is advantageous to observe that the presence of cold water in the thin blade is advantageous for cooling this member during the cutting process and after the process has terminated.

Both the trimmer 10 and the sprayer 11 are mounted at the end of the thin blade 20, and each of them is upwardly tilted at a respective predetermined angle. These angles are selected to optimize trimming for the jet 12 which points towards the outlet point 14 of the cutting jet 6, and to optimize spraying for the jet 13 which is directed towards the top of the parabolic trajectory followed by the falling molten particles. In practice, the supports for the cutter 5, trimmer 10, and sprayer 11 are vertically adjustable in position. By individually adjusting the cutter 5 and the blade 10 it is possible to adapt the apparatus to cutting pieces of different thicknesses.

It is also advantageous to provide for the thin blade 20 to be coupled to a vibrator suitable for generating vibrations of small amplitude in a vertical direction. Such a vibrator (not shown) is preferably integrated in the support for the thin blade 20. Setting the thin blade 20 into vertical vibration during the cutting process has the effect of shearing any metal drops that might stick to the thin blade in the slot. This ensures that the advance of the members 5, 10, and 11 is not disturbed during the cutting process.

A particular embodiment of the apparatus for implementing the method of the invention is described below with reference to FIGS. 6 and 7.

The slab 1 to be cut is positioned in a splitting area 17 fitted with a trench 18 into which the cutting jet penetrates. A self-propelled carriage 102 travels on its wheels 104 on a track 103 alongside the piece 1, parallel to the longitudinal axis of the slab. The carriage 102 carries a cantilevered-out beam or bracket 105, of rectangular section in this case, which in turn slidably carries a sleeve 106 above the slab that is to be cut. The sleeve 106 can be locked in position on the bracket 105 by means of a screw 107. As can be seen more clearly in FIG. 7, the sleeve 106 supports the supports 16 and 17 associated respectively with the cutter 5 and with the trimmer and the sprayer 10, 11. These supports 16, 17 are releasably fixed to the sleeve 106 with vertical adjustment enabling the corresponding members to be positioned appropriately. The supports 16 and 17 slide vertically in a plane which is the plane containing the three jets 6, 12, and 13. Each support 16, 17 can be set at the desired height by means of an associated screw 108, 109. FIG. 7 shows how the relative positions of the cutting jet 6, the trimming jet 12, and the spray jet 13 can be accurately positioned geometrically relative to the slab that is to be cut. There can also be seen pipes for feeding the various members, which pipes are connected to the tops of the supports 16 and 17. There can thus be seen pipes 110, 111 serving to feed the cutter with heating and cutting oxygen and with fuel gas, and pipes 112, 113 serving to feed the trimmer and the sprayer with trimming oxygen or water, and with water for extinguishing post-combustion.

Another embodiment is described below with reference to FIGS. 8 to 10, this embodiment corresponding to equipment for an oxygen-cutting machine of the type described in document WO-A-99/16570. That prior art machine, intended more particularly for cutting a piece that is being cast continuously, comprises a carriage fitted with a moving clamp for clamping onto the casting via its side faces. In the prior art machine, as a variant of the pendular cutting system that does not provide trimming of the cutting bead, provision is made for a chassis system carrying a cutter member and a trimmer member arranged in such a manner that the cutting jet is horizontal. It then suffices for that cutter unit to be replaced by another unit arranged in accordance with the invention so as to perform cutting by means of a vertical cutting jet, with trimming and spraying taking place on the underside of the continuous casting. This makes it possible to take advantage of numerous members that already exist on the machine that is already in use.

The figures are diagrams showing the various components of the machine, and for further details reference can be made to document WO-A-99/16570.

There can be seen a carriage 202 moving on wheels 203 running on associated rails 204 overlying the product to be cut 1. The two arms 205 of a moving clamp are pivotally mounted on sleeves 206 secured to the carriage 202 and they can be moved towards or away from each other by actuating on an associated actuator 207. The continuous casting 1 travels on support rollers A and when the moving clamp 205 is clamped, the carriage 202 is entrained by the movement of the piece to be cut. This guarantees that its advance is synchronized with that of the product. A motor-driven feeler 208 comes into contact with the product, thereby starting the oxygen-cutting sequence implemented by the associated cutter. In this case, the horizontal pendular cutter or cutter member using an oxygen-cutting jet as is conventionally used has been replaced by an oxygen-cutting unit in accordance with the invention.

There can be seen a removable frame 220 fixed to the structure of the carriage 202 by bolts 221. The removable frame 220 carries horizontal slideways 223 between which a slider 222 moves horizontally. The slider 222 is driven by a horizontal wormscrew 224 coupled to the outlet shaft of a drive motor 225. The slider 222 carries a sleeve 226 having the supports 16 and 17 mounted thereon which are respectively associated with the cutter 5 and with the trimmer and sprayer 10, 11. The heights of the supports 16 and 17 can naturally be adjusted and they can be locked in position using associated bolts 227.

Once the supports 16 and 17 are in place enabling the cutting jet and the trimming jet to meet at a point which is level with the bottom face of the slab to be cut, it suffices to actuate the drive motor 225 to cause the members 5, 10, 11 to move horizontally, thereby proceeding with a stage of cutting with simultaneous trimming and fluid spraying so as to reduce the amount of fume emission. The slider 222 is moved across the casting direction with great precision so that it is guaranteed that the casting bead is properly removed from the bottom face of the slab. The screw-and-nut system constituted by the wormscrew 224 and the slider 222 ensures that the various above-mentioned members advance regularly and accurately.

This provides a method and apparatus for oxygen cutting that enables the casting bead and post-combustion projections to be treated effectively for the purposes of fume reduction, and enables this to be performed on any type of piece that is to be cut, regardless of its width.

The invention is not limited to the embodiments described above, but on the contrary covers any variant using equivalent means to reproduce the essential characteristics specified above.

What is claimed is:

1. A method of oxygen cutting a piece of steel, in which a cutter member (5) is positioned in such a manner that the cutting jet (6) is directed towards a first face of the piece to be cut (1) and a trimmer member (10) is positioned in such a manner that the trimming jet (12) is directed towards a second face, opposite from the first face, towards the outlet point (14) of the oxygen-cutting jet so as to perform trimming simultaneously on the cutting bead as it forms on said second face, with the positioning of the cutter and trimmer members (5, 10) being such that the cutting jet (6) is applied to the top face (1.1) of the piece (1) in a substantially vertical direction, while the trimming jet (12) is applied to the bottom face (1.2) of said piece in an oblique direction that remains pointing towards the outlet point (14) of the cutting jet (6), simultaneous cutting and trimming being performed by moving the cutter and trimmer members (5, 10) horizontally in synchronous manner, wherein a sprayer member (11) is positioned beneath the piece (1) in such a manner that a fluid jet (13) is sprayed during the cutting process towards the molten particles ejected by the cutting jet (6) so as to reduce fume emission, wherein the sprayer member (11) is carried by the support (20) for the trimmer member (10) passing through the cut slot (1.3).

2. A method according to claim 1, wherein the spray jet (13) is directed towards the zone (15) at the top of the parabolic trajectory followed by falling molten particles.

3. A method according to claim 1, wherein the sprayer member (11) is moved horizontally synchronously with the cutter and trimmer members (5, 10), the cutting, trimming, and spray jets (6, 12, 13) remaining in a common vertical plane.

4. A method according to claim 1, wherein the support (20) for the trimmer and sprayer members (10, 11) is set into vertical vibration during the cutting process.

5. An apparatus for implementing a method of oxygen cutting a piece of steel, in which a cutter member (5) is positioned in such a manner that the cutting jet (6) is directed towards a first face of the piece to be cut (1) and a trimmer member (10) is positioned in such a manner that the trimming jet (12) is directed towards a second face, opposite from the first face, towards the outlet point (14) of the oxygen-cutting jet so as to perform trimming simultaneously on the cutting bead as it forms on said second face, with the positioning of the cutter and trimmer members (5, 10) being such that the cutting jet (6) is applied to the top face (1.1) of the piece (1) in a substantially vertical direction, while the trimming jet (12) is applied to the bottom face (1.2) of said piece in an oblique direction that remains pointing towards the outlet point (14) of the cutting jet (6), simultaneous cutting and trimming being performed by moving the cutter and trimmer members (5, 10) horizontally in synchronous manner, wherein a sprayer member (11) is positioned beneath the piece (1) in such a manner that a fluid jet (13) is sprayed during the cutting process towards the molten particles ejected by the cutting jet (6) so as to reduce fume emission, the apparatus comprising a carriage (2; 102; 202) that is horizontally movable on associated rails, said carriage carrying supports (16, 17) for a cutter member (5) and for a trimmer member (10), which supports overlie the piece to be cut (1), the support (17) for the trimmer member (10) including a thin blade (20) for passing through the cut slot (1.3), said thin blade (20) which supports the trimmer member (10) also supporting a fluid sprayer member (11).

6. Apparatus according to claim 5, wherein the trimmer and sprayer members (10, 11) are both mounted at the end of the thin blade (20), each being inclined upwards at a respective predetermined angle.

7. Apparatus according to claim 5, wherein the thin blade (20) is hollow for feeding the fluid(s) required.

8. Apparatus according to claim 5, wherein the thin blade (20) is coupled to a vibrator capable of imparting small-amplitude vibration in a vertical direction.

9. Apparatus according to claim 5, wherein the supports (16, 17) for the cutter, trimmer, and sprayer members (5, 10, 11) are individually adjustable in position in a vertical direction.

10. Apparatus according to claim 5, wherein the carriage (102) moves along the piece (1) and carries a cantilevered-out beam (105) on which the supports (16, 17) for the cutter, trimmer, and sprayer members (5, 10, 11) are mounted via a sleeve (106) slidably mounted on said beam.

11. Apparatus according to claim 5, for oxygen cutting a continuous casting, wherein the carriage (202) moves above the casting (1) and carries a moving clamp (205) for clamping onto said casting via its side faces, said carriage being capable of receiving a removable frame (220) carrying a slider (222) that is movable across the casting direction, which slider carries the supports (16, 17) for the cutter, trimmer, and sprayer members (5, 10, 11).

* * * * *